United States Patent

Hidekawa et al.

[11] Patent Number: 5,887,843
[45] Date of Patent: Mar. 30, 1999

[54] DYNAMIC DAMPER STRUCTURE

[75] Inventors: Osamu Hidekawa; Tamotsu Origuchi, both of Kanagawa-ken, Japan

[73] Assignee: Nissan Motor Co., Ltd., Kanagawa-ken, Japan

[21] Appl. No.: 911,984

[22] Filed: Aug. 15, 1997

[30]     Foreign Application Priority Data

Aug. 15, 1996   [JP]   Japan .................................. 8-215774

[51] Int. Cl.⁶ ........................... F16M 13/00; F16M 1/00; B62D 21/00; F16F 7/10
[52] U.S. Cl. ......................... 248/559; 248/638; 180/311; 180/902; 188/379
[58] Field of Search ................................... 248/559, 638; 188/378, 379, 380; 180/902, 311; 267/292

[56]              References Cited

U.S. PATENT DOCUMENTS

| 2,744,749 | 5/1956 | Fiedor ..................................... 248/559 |
| 4,693,217 | 9/1987 | Beer ........................................ 123/195 |
| 4,815,556 | 3/1989 | Sumimoto et al. ..................... 180/311 |
| 5,180,147 | 1/1993 | Andersson et al. ..................... 267/136 |

OTHER PUBLICATIONS

Structure of Chassis I, New Edition: Published by Sankaido in 1995. pp. 194–201.

*Primary Examiner*—Ramon O. Ramirez
*Attorney, Agent, or Firm*—McDermott, Will & Emery

[57]              ABSTRACT

A damping member includes a damper bracket fixed to an upper link bracket, a mass bracket Joined to the damper bracket via an elastic body, and a mass for vibration control supported by the mass bracket, an upper link bracket is provided on a rear axle housing for supporting one end of the upper link supported at another end thereof relative to a vehicle body, the upper link bracket has a wall portion for accommodating the damping member therein, and a stopper portion is provided on the damper bracket in oposition to an end part of the mass for enclosing the mass in cooperation with the wall portion of the upper link bracket.

5 Claims, 10 Drawing Sheets

DYNAMIC DAMPER STRUCTURE

The contents of Application No. TOKUGANHEI 8-215774, filed Aug. 15, 1996, in Japan are hereby incorporated by reference.

BACKGROUND OF THE INVENTION

1. Field of the Invention

The present invention relates to a dynamic damper structure for controlling vibrations of a vehicle body.

2. Description of Relevant Art

There has conventionally been a problem such that vibrations from a power train are transmitted to a vehicle body through a propeller shaft, axle shafts and upper links.

A particular conventional example will be explained with reference to a rear suspension apparatus shown in FIG. 1 (Structure of Chassis (I), New Edition: Published by Sankaido in 1995). A rear differential apparatus connected to a rear end of an unshown propeller shaft is accommodated in and supported by a rear differential housing 1. Right and left rear axles are connected to both side gears of the rear differential apparatus. The right and left rear axles are accommodated in and supported by rear axle housings 3 integral with the rear differential housing 1. Right and left rear wheel hubs 5 are connected to ends of the right and left rear axles in an interlocking manner. Upper link brackets 7 are mounted on the rear axle housings 3. Each upper link bracket 7 supports one end of an upper link 9 that constitutes a suspension link of which another end is supported relative to a vehicle body. Designated at reference character 11 is a shock absorber, 13 is a coil spring, 15 is a lower control arm, and 17 is a lateral control rod.

The rear axle housing 3 accommodating the rear axle is supported relative to the vehicle body via the upper link 9, lower control arm 15 and lateral control rod 17. Accordingly, when a driving force is transmitted from a power train end through the propeller shaft, rear differential apparatus and rear axle to the rear wheel hub 5, vibrations at the power train end are transmitted from the rear axle housing 3 to the vehicle body, via the upper link bracket 7 and the upper link 9. To this point, an improvement has been desired.

In such the case, a so-called dynamic damper structure may be provided in the rear axle housing 3 and the like. In a peripheral portion of a typical rear axle housing 3, however, there are crowded with many parts such as brake horses so that it is spatially difficult to install a dynamic damper structure.

Further, since the dynamic damper structure has a mass for control, it is required to limit a motion of the mass at a time of rear end collision of the vehicle and the like so as to control effects to the other parts. The provision of a special member results in an unfavorable increase in number of parts.

SUMMARY OF THE INVENTION

Accordingly, an object of the present invention is to provide a dynamic damper structure which can be disposed in a spatially advantageous manner and in addition to this, can limit a motion of a mass for control, even at a time of rear end collision, without a significant increase in number of parts.

To achieve the object, a first aspect of the invention provides a dynamic damper structure comprising a damping member including a damper bracket fixed to an upper link bracket, a mass bracket joined to the damper bracket via an elastic body, and a mass supported by the mass bracket, an upper link bracket provided on a rear axle housing for supporting one end of the upper link supported at another end thereof relative to a vehicle body, the upper link bracket having a wall portion for accommodating the damping member therein, and a stopper portion provided on the damper bracket in oposition to an end part of the mass for enclosing the mass in cooperation with the wall portion of the upper link bracket.

Accordingly, the damping member can be received and disposed between the wall portions of the upper link bracket so as to be mounted therebetween. Further, in a mounted state, the mass can be surrounded by cooperation of the wall portion between the stopper portion provided in the damper bracket and the upper link bracket.

According to a second aspect of the invention, as it depends from the first aspect, the wall portion of the upper link bracket comprises a left and a right wall portion opposing each other in a transverse direction of the vehicle body, the left and the right wall portion having support parts provided at upper parts thereof for supporting said one end of the upper link, and a rear wall portion interconnecting the left and the right wall portion with each other, the damping member is accommodated between the left and the right wall portion, and the damper bracket is fixed to the rear wall portion.

Accordingly, in addition to the effect obtained by the first aspect, the damping member can be fixed to the rear wall portion of the upper link bracket and is received and disposed between the right and left wall portions of the upper link bracket.

According to a third aspect of the invention, as it depends from the second aspect, the left and the right wall portion cover the mass.

Accordingly, in addition to the effect obtained by the second aspect, when the rear axle housing is moved to a front portion of the vehicle at a time of rear end collision of the vehicle, the right and left wall portions of the upper link bracket can be hit against the other parts disposed in front prior to the mass of the damping member.

According to a fourth aspect of the invention, as it depends from the third aspect, the left and the right wall portion have laterally curved curl parts provided at front edges thereof.

Accordingly, in addition to the effect obtained by the third aspect, when the rear axle housing is moved to the front portion of the vehicle at a time of rear end collision of the vehicle, the curl portions of the right and left wall portions of the upper link bracket can be hit prior to the mass of the damping member.

According to a fifth aspect of the invention, as it depends from any of the second to the fourth aspect, the damper bracket has a bolt part projecting therefrom, the rear wall portion of the upper link bracket has a fixing hole formed therethrough, and the damper bracket is fixed to the upper link bracket, with the bolt part provided through the fixing hole and fastened with a nut.

Accordingly, in addition to the effect obtained by any one of the second to the fourth aspect, the damping member can be fixed to the upper link bracket by passing the bolt portion of the damping member through the mounting hole of the upper link bracket and fastening the nut to the bolt portion.

Therefore, according to the first aspect, since the damping member can be received and disposed between the wall portions of the upper link bracket, it is spatially advantageous. Further, since the mass for control of the damping member can be surrounded by the cooperation of the stopper portion of the damper bracket and the wall portion of the upper link bracket, the motion of the mass can be limited by the stopper portion and the wall portion even at a time of rear end collision so that interference of the mass against the other parts, for example, a fuel tank disposed in front can be prevented. Still further, since the mass is surrounded by using the wall portion of the upper link bracket, a number of the parts is not significantly increased so that parts control and assembling are easily performed.

According to the second aspect, the damping member can be fixed to the rear wall portion of the upper link bracket and is securely received and disposed between the right and left wall portions.

According to third aspect, the right and left wall portions can be hit against the other parts, for example, the fuel tank disposed in front prior to the mass at a time of rear end collision of the vehicle so that direct interference by the mass can be limited.

According to the fourth aspect, the curl portions of the right and left wall portions is hit so that influence to the other parts due to the hit can be softened.

According to the fifth aspect, the damping member can be securely fixed by fastening between the bolt and nut so that the damping member can be securely received and disposed between the right and left wall portions.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
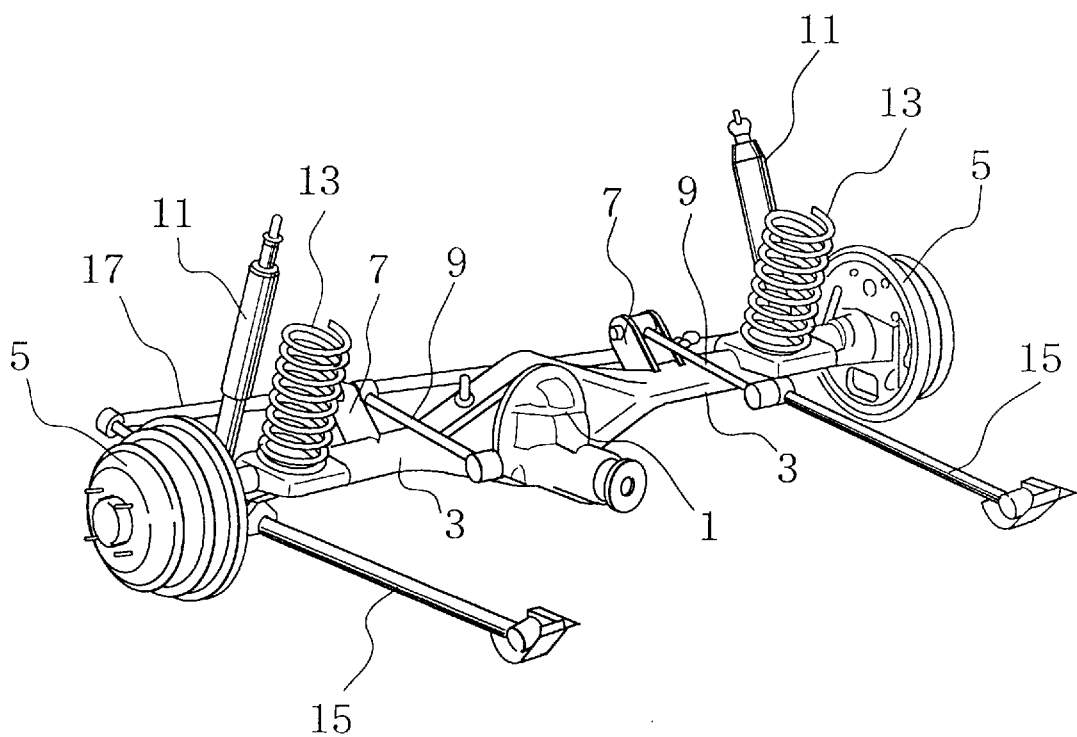
FIG. 1 is a perspective view which shows a rear suspension apparatus in accordance with a conventional embodiment.

There will be detailed below the preferred embodiments of the present invention with reference to the accompanying drawings. Like members are designated by like reference characters.

Figure 2:
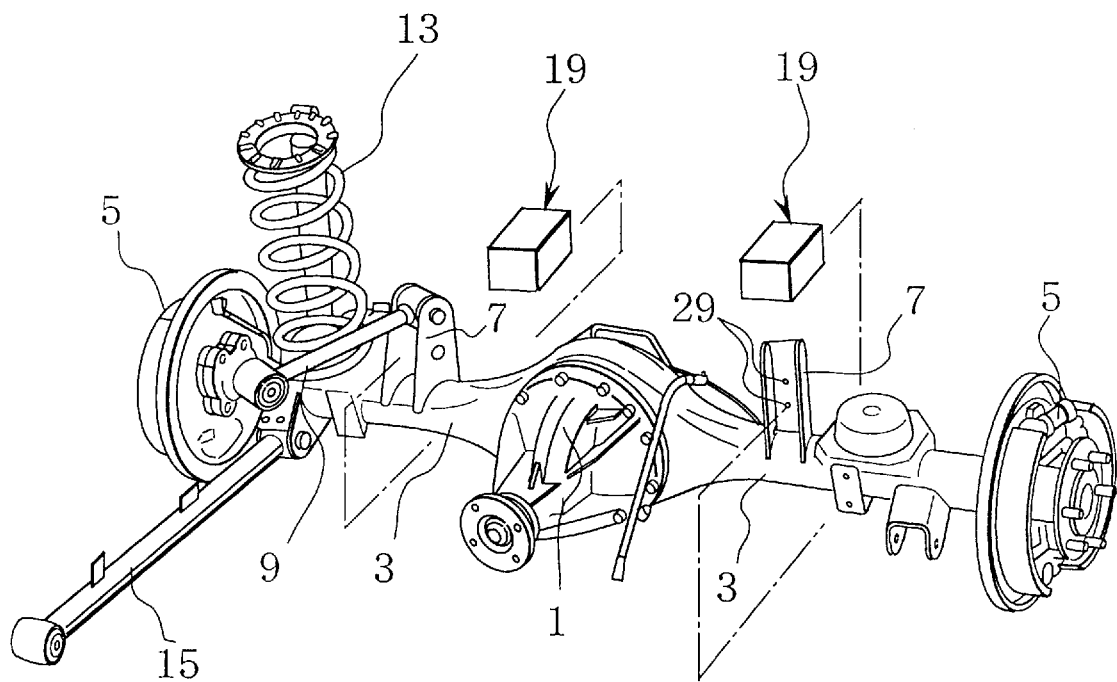
FIG. 2 is a partially omitted perspective view of a rear suspension to which a dynamic damper structure in accordance with an embodiment of the present invention is applied.
Figure 3:
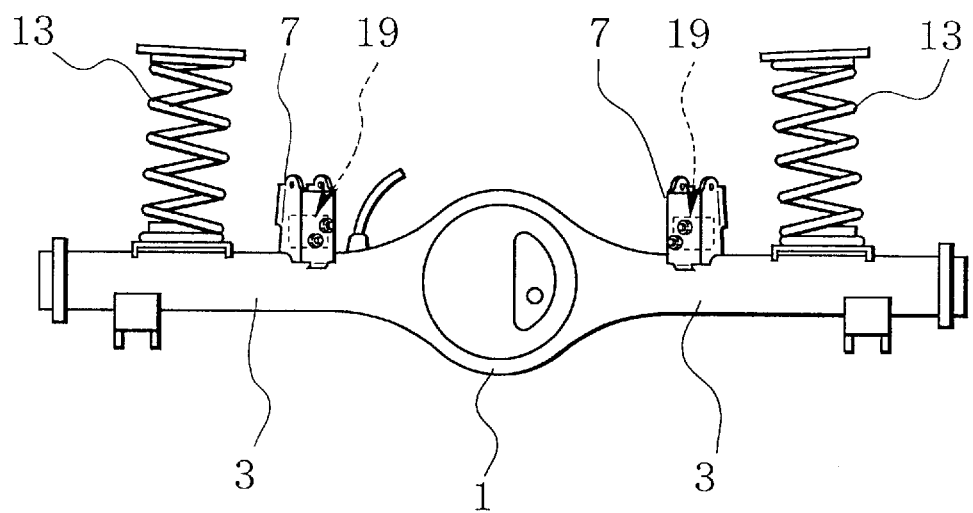
FIG. 3 is a partially omitted rear view of a peripheral portion of a rear suspension as seen from a rear portion of a vehicle, to which a dynamic damper structure in accordance with an embodiment of the present invention is applied.
Figure 4:
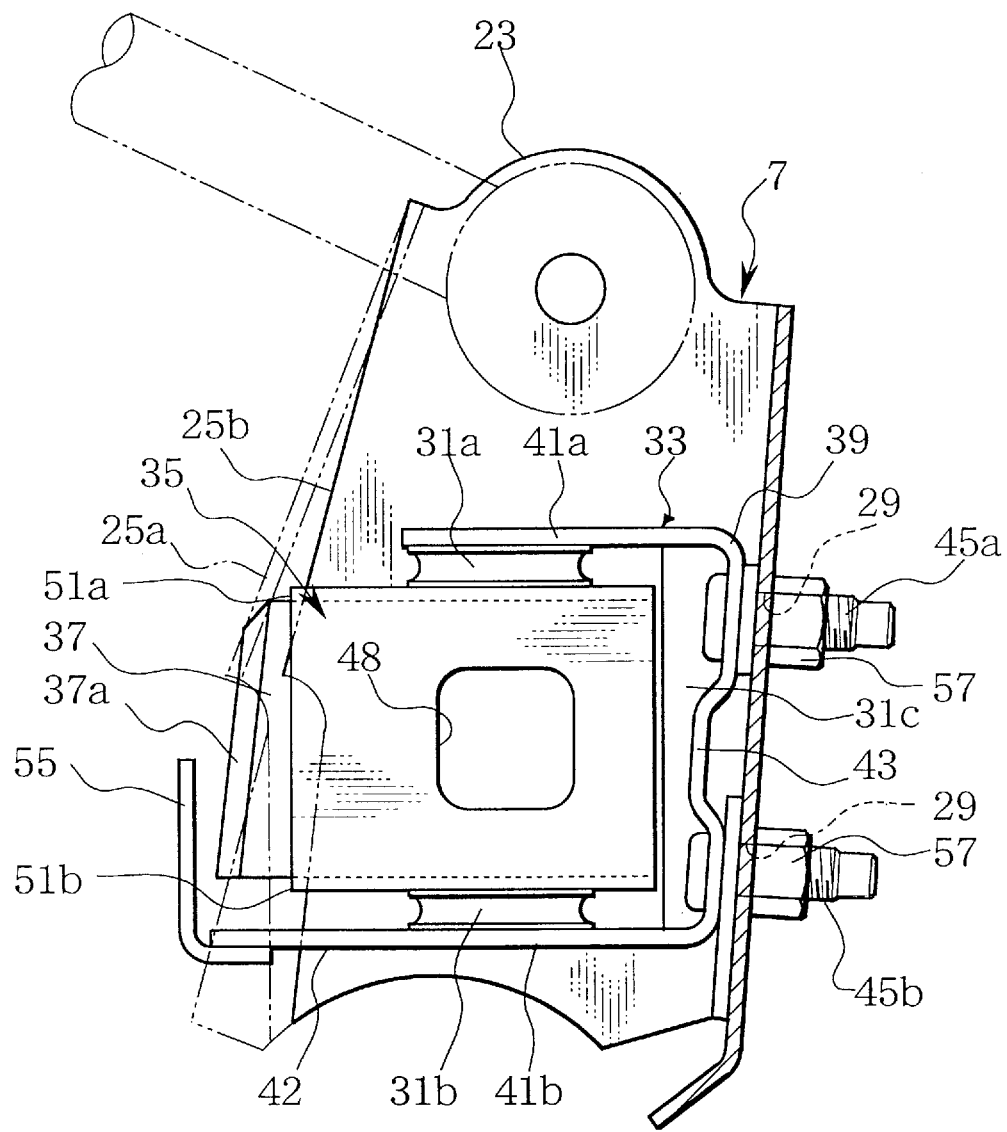
FIG. 4 is a cross sectional view which shows a relation between an upper link bracket and a damping member.
Figure 5:
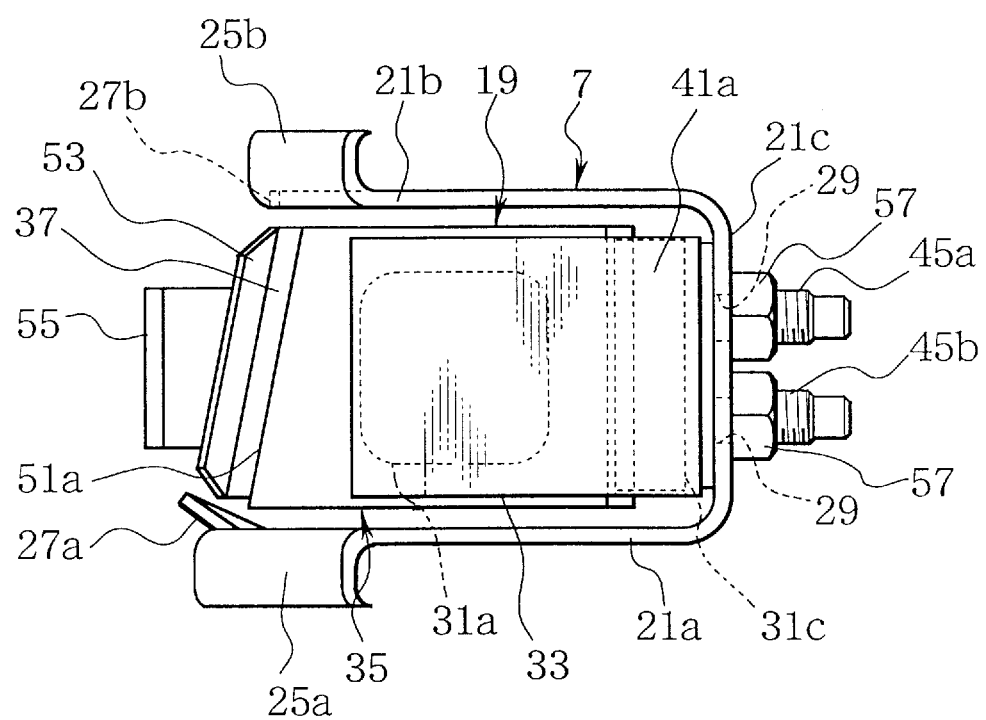
FIG. 5 is a plan view which shows a relation between an upper link bracket and a damping member.
Figure 6:
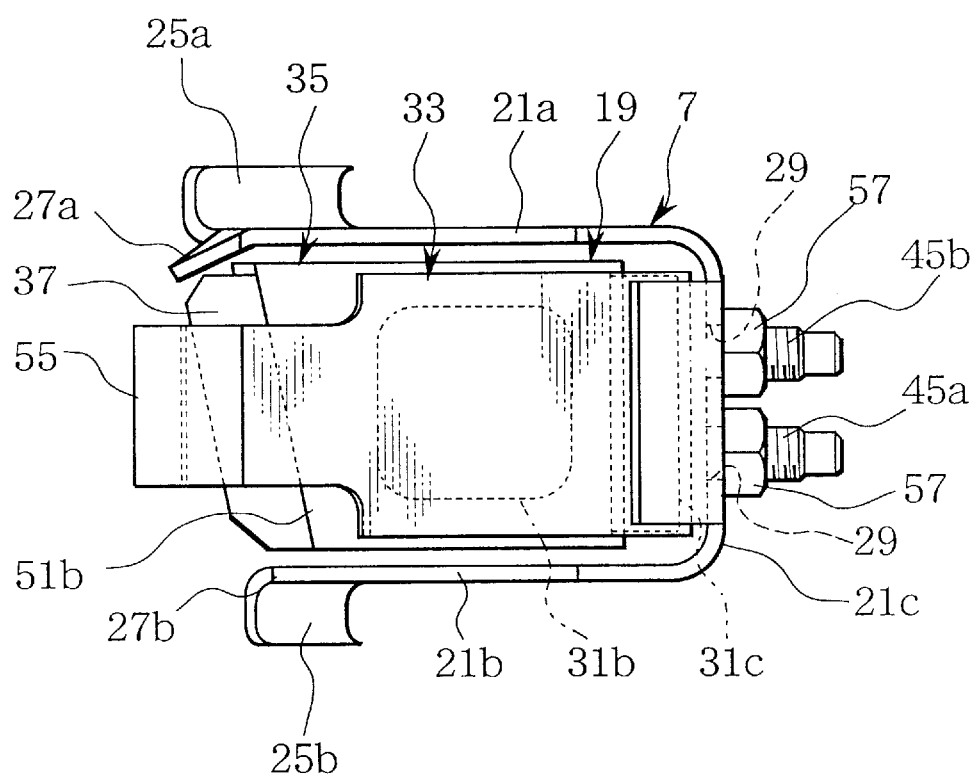
FIG. 6 is a bottom view which shows a relation between an upper link bracket and a damping member.

FIG. 2 is a partially omitted perspective view of a rear suspension to which a dynamic damper structure in accordance with an embodiment of the present invention is applied, FIG. 3 is a schematic rear view as seen from a rear portion of a vehicle in which the same portion is omitted, FIG. 4 is a cross sectional view which shows a relation between an upper link bracket and a damping member, FIG. 5 is a plan view of FIG. 4 and FIG. 6 is a bottom view of FIG. 4.

In the embodiment of the present invention, a dynamic damper structure is constructed by fixing a damping member 19 to the upper link bracket 7 as shown in FIGS. 2 to 6. Accordingly, the upper link bracket 7 has right and left wall portions 21a and 21b opposing to each other in the lateral direction of the vehicle and a rear wall portion 21c connecting the right and left wall portions to each other and is formed in such a manner as to have a substantially U-shaped cross section substantially directing to a front portion of the vehicle. In an upper portion of the right and left wall portions 21a and 21b, a support portion 23 for supporting the other end of the upper link 9 is provided. A front edge of each of the upper portions of the wall portions 21a and 21b is provided with curl portions 25a and 25b curved laterally and outwardly. A lower portion 27a of the front edge of the right wall portion 21b which is disposed in a portion close to an inner side of the lateral direction of the vehicle among the wall portions 21a and 21b has a straight shape for the purpose of being connected to the rear axle housing 3. A lower portion 27b of the left wall portion 21a is also provided with no curl portion for the purpose of being connected to the rear axle housing 3, and further, is bent inwardly in the lateral direction as shown in FIG. 6 so as to avoid interference against the coil spring 13. The rear wall portion 21c is provided with two mounting holes 29 so as to pass through the wall portion.

The damping member 19 is structured such as to be received and disposed between the wall portions 21a and 21b in the lower portion of the support portion 23.

Figure 7:
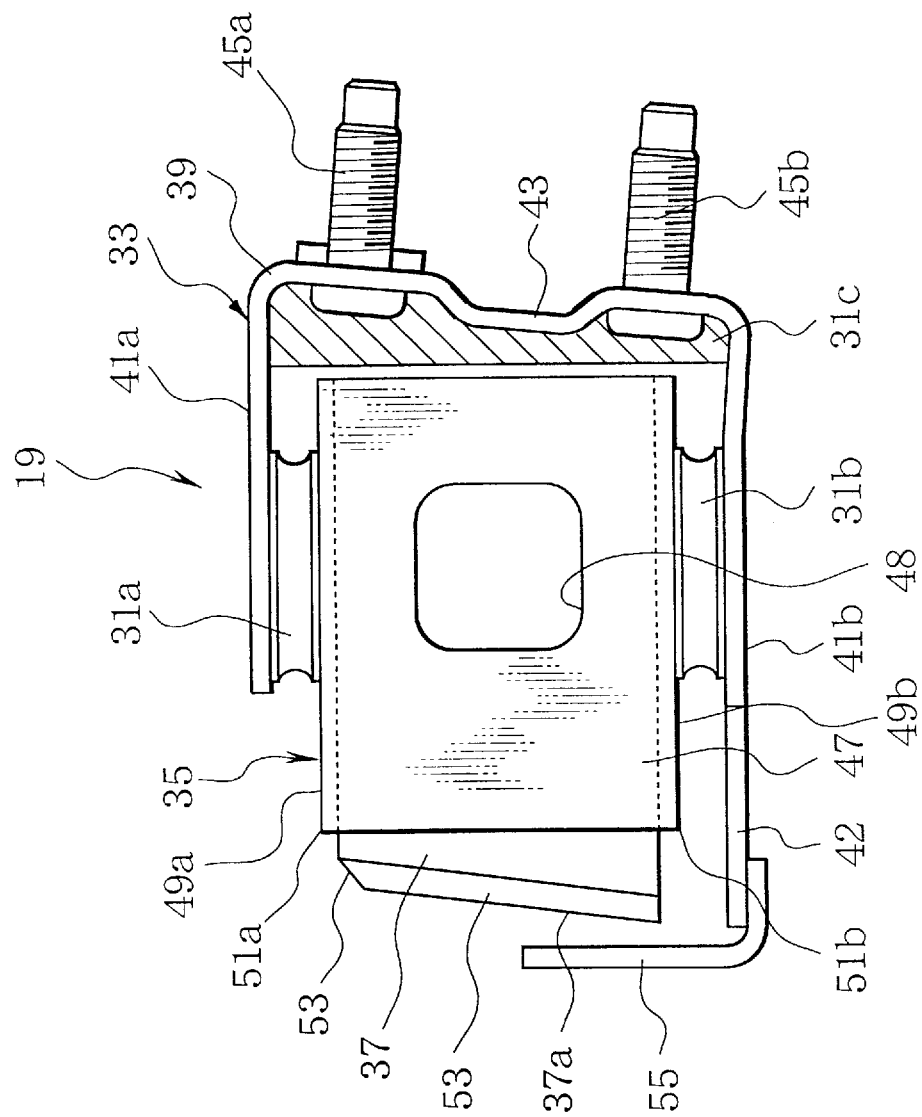
FIG. 7 is a side elevational view of a damping member.
Figure 8:
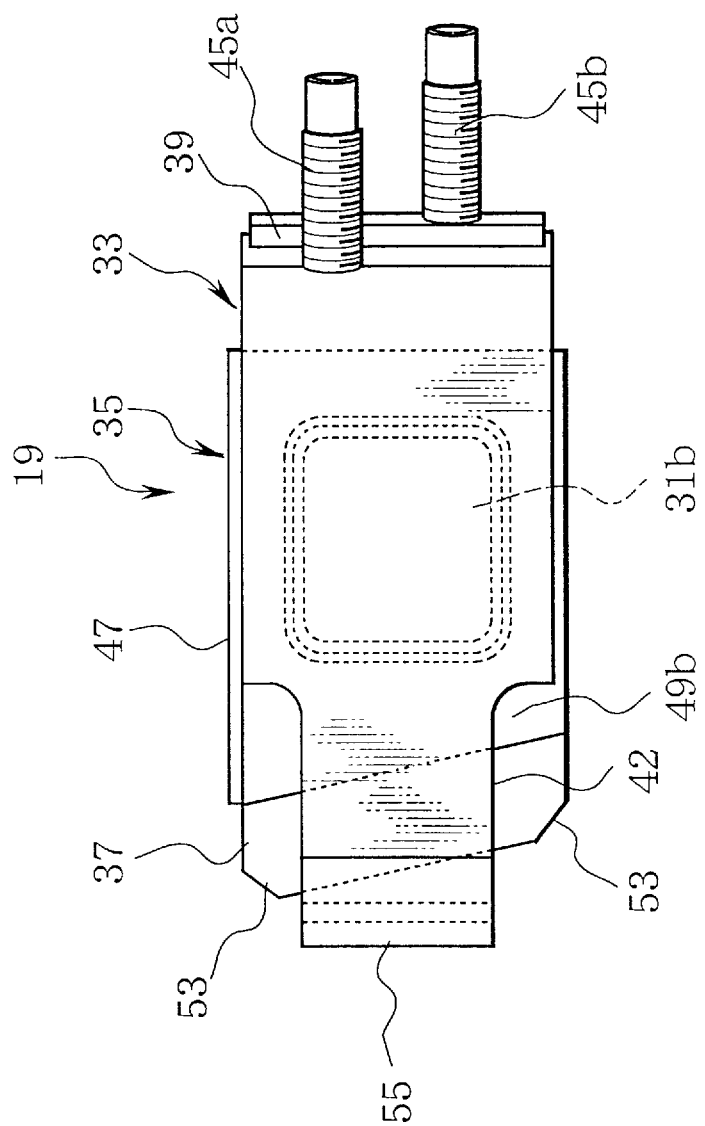
FIG. 8 is a bottom view of a damping member.
Figure 9:
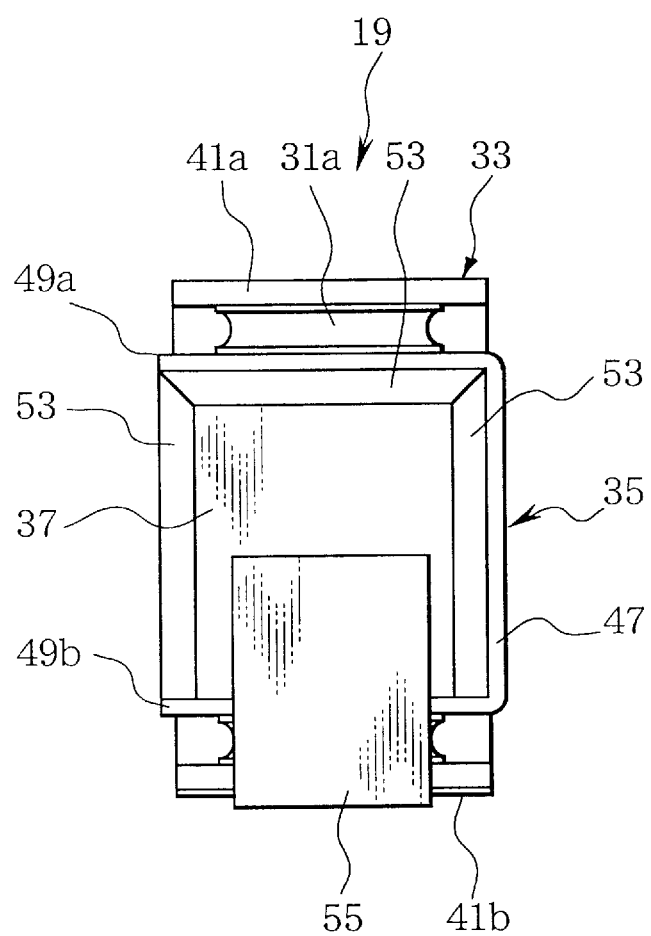
FIG. 9 is a front view of a damping member.

The damping member is structured such as shown in FIGS. 7 to 9. FIG. 7 is a side elevational view, FIG. 8 is a bottom view and FIG. 9 is a front view as seen from the front portion of the vehicle. As shown in FIGS. 7 to 9, the damping member 19 has a damper bracket 33 and a mass bracket 35 which are connected to each other by an elastic body, for example, rubbers 31a and 31b and is structured such that a mass 37 for control is supported by the mass bracket 35.

The damper bracket 33 is provided with a support vertical plate portion 39 extending along the vertical direction and a pair of upper and lower support horizontal plate portions 41a and 41b bent from the upper and lower ends of the support vertical plate portion 39 and opposing to each other in the vertical direction and is formed to have a U-shaped cross section. A front portion of the lower support horizontal plate portion 41b is provided with a narrow extending portion 42 as shown in FIGS. 6 and 7. The support vertical plate portion 39 is provided with a recess portion 43 for improving rigidity. Upper and lower portions of the recess portion 43 is fixedly provided with bolt portions 45a and 45b by welding or the like. A front side of the support vertical plate portion 39 is fixedly provided with an elastic body, for example, a rubber 31c.

The mass bracket 35 comprises a mass vertical plate portion 47 which is formed in such a manner as to have a length in the vertical direction than the support vertical plate portion 39 of the damper bracket 33 and has an opening 48, and a pair of upper and lower mass horizontal plate portion 49a and 49b which is provided in upper and lower portions of the mass vertical plate portion 47 in a vent manner and is opposed to each other in the vertical direction, and has a U-shaped cross section.

The mass 37 is disposed between the upper and lower mass horizontal plate portions 49a and 49b, totally has a substantially rectangular solid shape and has a front end inclined to slightly lower and leftward directions. The mass 37 is welded to the upper and lower mass horizontal plate portions 49a and 49b in front edge portions 51a and 51b of the upper and lower mass horizontal plate portions 49a and 49b and also welded to the mass vertical plate portion 47 in the opening 48. A cutaway 53 is provided at an upper edge and right and left side edges of the front end portion in the mass 37 and serves to soften an influence at a time of hitting the other parts.

A front end of the extending portion 42 of the lower support horizontal plate portion 41b is provided with a stopper portion 55 which is bent in a L-shaped manner and is fixed to the extending portion 42 by welding and the like. The stopper portion 55 is opposed to a lower portion 37a of the mass 37 at an opposing side of the support vertical plate portion 39.

Then the damping member 19 is received and disposed between the right and left wall portions 21a and 21b of the upper link bracket 7 as mentioned above, the bolt portions 45a and 45b are inserted through the mounting hole 29 of the rear wall portion 21c and a nut 57 is fastened thereto so that the damping member 19 is fixed to the rear wall portion 21c.

In this state, the wall portions 21a and 21b have a dimension capable of covering the mass 37. Since the lower portion 27a of the left wall portion 21a is structured such as to be bent inwardly in the lateral direction of the vehicle, when the curl portion 25a is also used, the front end lower portion 37a of the mass 37 slightly projects from the left wall 21a to the front direction. Since the mass 37 needs a sufficient degree of dimension to function as a dynamic damper, the projection of the lower portion 37a can not be prevented by decreasing the dimension of the mass 37.

Accordingly, the lower portion 37a is covered by the stopper 55 at the front side.

Figure 10A:
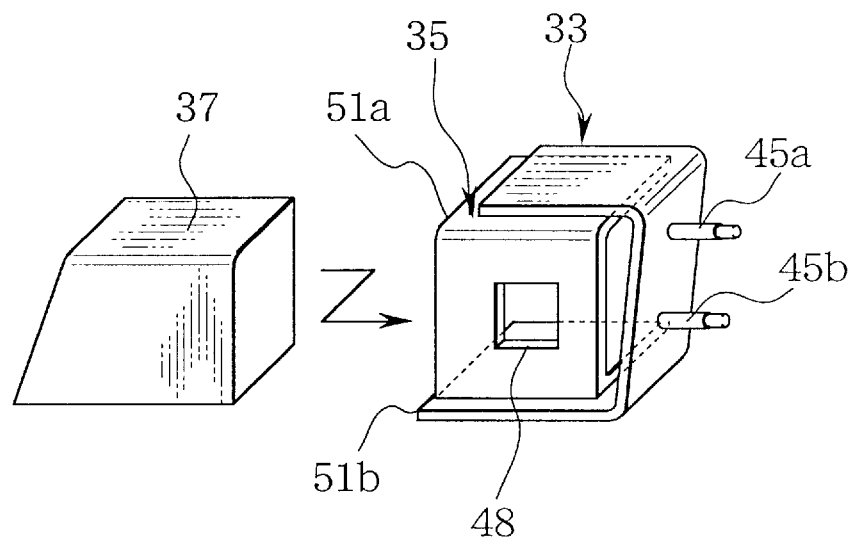
FIGS. 10A and 10B are schematic views which explain a manufacturing process of a damping member.
Figure 10B:
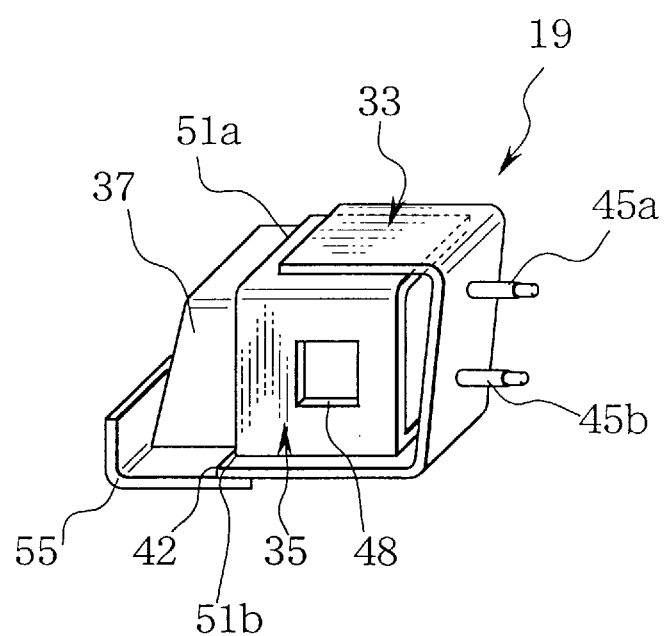

A manufacturing process of the damping member 19 is schematically shown in FIGS. 10A and 10B. As shown in FIG. 10A, at first the damper bracket 33 and the mass bracket 35 are combined as in a manner shown in FIG. 10A and the rubbers 31a, 31b and 31c are vulcanized with sulfur. Next, the mass 37 is inserted into the mass bracket 35 and is welded to the mass bracket 35 at positions of the front edge portions 51a and 51b of the mass bracket 35 and the opening 48 of the mass bracket 35 as shown in FIG. 10B so that the mass 37 is fixed to the mass bracket 35. Next, the stopper portion 55 is fixed by welding to the extending portion 42 of the mass bracket 35 so that the damping member 19 as shown in FIG. 10B can be obtained. In this case, if in place of providing the mass bracket 35 at a time of assembling the mass 37, the rubbers 31a and 31b are directly vulcanized with sulfur between the damper bracket 33 and the mass 37, it is difficult to form with sulfur due to the large heat capacity of the mass 37. However, the vulcanization with sulfur can be smoothly performed by providing the mass bracket 35.

When the damping member 19 is assembled to the upper link bracket 7 as shown in FIGS. 1 and 2, a sub vibration system comprising the mass 37 and the rubbers 31a and 31b performs a damping operation with respect to a main vibration system comprising the coil spring 13 and the rear axle housing 33 and the like, thereby functioning as a dynamic damper. Accordingly, it is possible to significantly control the transmission of the vibration from the power train as a vibration source to the vehicle body through the upper link bracket 7 and the upper link 9.

Further, since the damping member 19 is structured such as to be received and disposed in the upper link bracket 7, a design which is significantly advantageous in space can be obtained.

Still further, the mass 37 of the damping member 19 can be covered by the upper link bracket 7, the damper bracket 33 and the mass bracket 35, the stopper portion 55 can be disposed in an opposed manner to the front portion of the mass 37 and the mass 37 can be surrounded by the wall portions 21a and 21b, the support vertical plate portion 39, the stopper 55 and the like so that it can be prevented that the mass 37 falls off to disperse.

Furthermore, in the case that the rear upper link bracket 7 is moved toward the front portion together with the rear axle housing 3 at a time of rear end collision, since the right and left wall portions 21a and 21b of the upper link bracket 7 is formed in such a manner as to have a dimension capable of covering the mass 37, the right and left wall portions 21a and 21b can be hit against the other parts, for example, the fuel tank disposed in front prior to the mass 37. Accordingly, the influence to the fuel tank and the like can possibly be controlled. Particularly, the hitting force can be more softened by the curl portions 25a and 25b so that the damage in the other parts can be greatly prevented. Moreover, in the lower portion 37a of the mass 37, the stopper 55 is previously hit against the other parts so that the influence due to direct hitting of the mass 37 can be avoided.

While preferred embodiments of the present invention have been described using specific terms, such description is for illustrative purposes, and it is to be understood that changes and variations may be made without departing from the spirit or scope of the following claims.

What is claimed is:

1. A dynamic damper structure for use with a rear axle housing of a vehicle body said dynamic damper structure comprising:

a damping member including a damper bracket fixed to an upper link bracket, a mass bracket joined to the damper bracket via an elastic body, and a mass supported by the mass bracket;

an upper link bracket provided on the rear axle housing for supporting one end of the upper link supported at another end thereof relative to the vehicle body, the upper link bracket having a wall portion for accommodating the damping member therein; and a stopper portion provided on the damper bracket in opposition to an end part of the mass for enclosing the mass in cooperation with the wall portion of the upper link bracket.

2. A dynamic damper structure according to claim 1, wherein:

the wall portion of the upper link bracket comprises:
        a left and a right wall portion opposing each other in a transverse direction of the vehicle body, the left and right wall portion having a support portion provided at an upper portion of the left and right wall portion for supporting said one end of the upper link; and
        a rear wall portion interconnecting the left and the right wall portion with each other;
    the damping member is accommodated between the left and the right wall portion; and the damper bracket is fixed to the rear wall portion.

3. A dynamic damper structure according to claim 2, wherein the left and the right wall portion cover the mass.

4. A dynamic damper structure according to claim 3, wherein the left and the right wall portion have laterally curved curl parts provided at front edges thereof.

5. A dynamic damper structure according to any of claim according to 2 to 4, wherein:

the damper bracket has a bolt part projecting therefrom;

the rear wall portion of the upper link bracket has a fixing hole formed therethrough; and the damper bracket is fixed to the upper link bracket, with the bolt part provided through the fixing hole and fastened with a nut.

\* \* \* \* \*